(12) United States Patent
Shin et al.

(10) Patent No.: US 8,560,324 B2
(45) Date of Patent: *Oct. 15, 2013

(54) MOBILE TERMINAL AND MENU CONTROL METHOD THEREOF

(75) Inventors: Jong-Ho Shin, Seoul (KR); Jae-Do Kwak, Seoul (KR); Jong-Keun Youn, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/362,353

(22) Filed: Jan. 31, 2012

(65) Prior Publication Data

US 2012/0130712 A1 May 24, 2012

Related U.S. Application Data

(63) Continuation of application No. 12/140,107, filed on Jun. 16, 2008, now Pat. No. 8,150,700.

(30) Foreign Application Priority Data

Apr. 8, 2008 (KR) .................. 10-2008-0032842

(51) Int. Cl.
 *G10L 21/00* (2013.01)
(52) U.S. Cl.
 USPC ........... 704/275; 704/231; 704/232; 704/233; 704/234; 704/251; 704/252; 704/253; 704/254; 704/255; 704/270; 704/271; 704/273; 704/274; 704/256; 704/257; 704/240; 704/241
(58) Field of Classification Search
 USPC ......................... 704/231, 270–275
 See application file for complete search history.

(56) References Cited

U.S. PATENT DOCUMENTS 5,471,470 A * 11/1995 Sharma et al. ................. 370/271
5,664,061 A * 9/1997 Andreshak et al. ........... 704/275

(Continued)

FOREIGN PATENT DOCUMENTS

CA 2647190 A1 10/2007
CA 2650457 A1 11/2007

(Continued)

OTHER PUBLICATIONS

Chang et al., "A System for Spoken Query Information Retrieval on Mobile Devices," IEEE Transactions on Speech and Audio Processing, vol. 10, No. 8, Nov. 2002, XP011079677, pp. 531-541.

(Continued)

*Primary Examiner* — Pierre-Louis Desir
*Assistant Examiner* — Fariba Sirjani
(74) *Attorney, Agent, or Firm* — Birch, Stewart, Kolasch & Birch, LLP

(57) ABSTRACT

A mobile terminal including an input unit configured to receive an input to activate a voice recognition function on the mobile terminal, a memory configured to store information related to operations performed on the mobile terminal, and a controller configured to activate the voice recognition function upon receiving the input to activate the voice recognition function, to determine a meaning of an input voice instruction based on at least one prior operation performed on the mobile terminal and a language included in the voice instruction, and to provide operations related to the determined meaning of the input voice instruction based on the at least one prior operation performed on the mobile terminal and the language included in the voice instruction and based on a probability that the determined meaning of the input voice instruction matches the information related to the operations of the mobile terminal.

18 Claims, 12 Drawing Sheets

(56) References Cited

U.S. PATENT DOCUMENTS

| | | | |
|---|---|---|---|
| 6,233,560 B1* | 5/2001 | Tannenbaum | 704/275 |
| 6,587,824 B1* | 7/2003 | Everhart et al. | 704/275 |
| 6,622,119 B1* | 9/2003 | Ramaswamy et al. | 704/9 |
| 6,895,380 B2* | 5/2005 | Sepe, Jr. | 704/275 |
| 6,931,384 B1* | 8/2005 | Horvitz et al. | 706/45 |
| 6,993,486 B2* | 1/2006 | Shimakawa | 704/275 |
| 7,379,876 B2* | 5/2008 | Nakata | 704/275 |
| 7,392,193 B2 | 6/2008 | Mault | |
| 7,555,431 B2* | 6/2009 | Bennett | 704/255 |
| 7,620,549 B2* | 11/2009 | Di Cristo et al. | 704/257 |
| 7,680,658 B2* | 3/2010 | Chung et al. | 704/235 |
| 7,729,920 B2* | 6/2010 | Chaar et al. | 704/275 |
| 7,809,664 B2 | 10/2010 | Heck | |
| 7,840,579 B2* | 11/2010 | Samuelson et al. | 707/758 |
| 7,917,367 B2* | 3/2011 | Di Cristo et al. | 704/270.1 |
| 7,957,972 B2* | 6/2011 | Huang et al. | 704/260 |
| 7,957,975 B2* | 6/2011 | Burns et al. | 704/260 |
| 8,069,041 B2* | 11/2011 | Kuboyama et al. | 704/236 |
| 8,145,273 B2* | 3/2012 | Lee et al. | 455/563 |
| 8,150,700 B2* | 4/2012 | Shin et al. | 704/275 |
| 8,185,392 B1 | 5/2012 | Strope et al. | 704/252 |
| 8,233,025 B2* | 7/2012 | Lee et al. | 348/14.02 |
| 2001/0011028 A1* | 8/2001 | Wendelrup | 455/563 |
| 2001/0047265 A1* | 11/2001 | Sepe, Jr. | 704/275 |
| 2002/0032567 A1* | 3/2002 | Lindholm et al. | 704/246 |
| 2002/0072910 A1* | 6/2002 | Kernble et al. | 704/270 |
| 2002/0152071 A1* | 10/2002 | Chaiken et al. | 704/251 |
| 2003/0154077 A1 | 8/2003 | Tahara et al. | |
| 2004/0006478 A1* | 1/2004 | Alpdemir et al. | 704/275 |
| 2004/0044516 A1* | 3/2004 | Kennewick et al. | 704/5 |
| 2004/0122666 A1* | 6/2004 | Ahlenius | 704/231 |
| 2005/0033582 A1* | 2/2005 | Gadd et al. | 704/277 |
| 2005/0159959 A1* | 7/2005 | Benco et al. | 704/277 |
| 2005/0165609 A1* | 7/2005 | Zuberec et al. | 704/270 |
| 2005/0177373 A1* | 8/2005 | Cooper et al. | 704/275 |
| 2005/0197843 A1* | 9/2005 | Faisman et al. | 704/276 |
| 2005/0283364 A1* | 12/2005 | Longe et al. | 704/257 |
| 2006/0106614 A1* | 5/2006 | Mowatt et al. | 704/275 |
| 2006/0116987 A1* | 6/2006 | Bernard | 707/3 |
| 2006/0149555 A1* | 7/2006 | Fabbrizio et al. | 704/275 |
| 2006/0178746 A1* | 8/2006 | Braho et al. | 704/246 |
| 2007/0055531 A1* | 3/2007 | Nada | 704/275 |
| 2007/0112571 A1* | 5/2007 | Thirugnana | 704/270 |
| 2007/0186480 A1* | 8/2007 | Freeman | 49/358 |
| 2007/0239445 A1* | 10/2007 | Kobal et al. | 704/245 |
| 2007/0239459 A1* | 10/2007 | Horvitz | 704/275 |
| 2007/0288242 A1* | 12/2007 | Spengler et al. | 704/275 |
| 2008/0049905 A1* | 2/2008 | Seo | 379/88.03 |
| 2008/0074399 A1* | 3/2008 | Lee | 345/173 |
| 2008/0091426 A1* | 4/2008 | Rempel et al. | 704/251 |
| 2008/0120102 A1* | 5/2008 | Rao | 704/235 |
| 2008/0120106 A1* | 5/2008 | Izumida et al. | 704/251 |
| 2008/0154601 A1* | 6/2008 | Stifelman et al. | 704/251 |
| 2008/0154612 A1* | 6/2008 | Evermann et al. | 704/275 |
| 2008/0215516 A1* | 9/2008 | Chaar et al. | 706/46 |
| 2008/0221879 A1* | 9/2008 | Cerra et al. | 704/235 |
| 2008/0221903 A1* | 9/2008 | Kanevsky et al. | 704/275 |
| 2008/0243502 A1* | 10/2008 | Ativanichayaphong et al. | 704/240 |
| 2008/0243515 A1* | 10/2008 | Odinak | 704/270.1 |
| 2009/0164215 A1* | 6/2009 | Lu et al. | 704/246 |
| 2009/0192898 A1* | 7/2009 | Baril | 705/14 |
| 2009/0204410 A1* | 8/2009 | Mozer et al. | 704/275 |
| 2009/0216538 A1* | 8/2009 | Weinberg et al. | 704/275 |
| 2009/0234655 A1* | 9/2009 | Kwon | 704/270.1 |
| 2009/0253463 A1* | 10/2009 | Shin et al. | 455/563 |
| 2009/0299730 A1* | 12/2009 | Joh et al. | 704/9 |
| 2009/0306980 A1* | 12/2009 | Shin | 704/235 |
| 2009/0313014 A1* | 12/2009 | Shin | 704/235 |
| 2009/0326936 A1* | 12/2009 | Nagashima | 704/235 |
| 2010/0009719 A1* | 1/2010 | Oh et al. | 455/563 |
| 2010/0009720 A1* | 1/2010 | Cha et al. | 455/566 |
| 2010/0094632 A1* | 4/2010 | Davis et al. | 704/260 |
| 2010/0318366 A1* | 12/2010 | Sullivan et al. | 704/275 |
| 2012/0130712 A1* | 5/2012 | Shin et al. | 704/231 |
| 2012/0166193 A1* | 6/2012 | Kobal et al. | 704/235 |

FOREIGN PATENT DOCUMENTS

| | | |
|---|---|---|
| CA | 2654161 A1 | 12/2007 |
| CN | 1635768 A | 7/2005 |
| CN | 1713660 A | 12/2005 |
| EP | 0 961 263 A2 | 12/1999 |
| EP | 1 024 476 A1 | 8/2000 |
| EP | 1 610 534 A1 | 12/2005 |
| JP | 62-37734 A | 2/1987 |
| JP | 5-341951 A | 12/1993 |
| JP | 7-140998 A | 6/1995 |
| JP | 2000-56792 A | 2/2000 |
| JP | 2003-241790 A | 8/2003 |
| JP | 2007-225793 A | 9/2007 |
| JP | 2007-280179 A | 10/2007 |
| KR | 10-2008-0032842 | 4/2008 |
| WO | WO 2007/129196 A3 | 11/2007 |

OTHER PUBLICATIONS

Ishikawa et al., "Parallel LVCSR Algorithm for Cellphone-Oriented Multicore Processors," Acoustics, Speech and Signal Processing, IEEE Conference, France, May 2006, pp. 1-177 thru 1-180, XP031330850.

Lencevicius et al., "Semantic integration and language access to mobile data," Internet citation, Sep. 2007, pp. 1-4, XP007915357, URL:http://www.medien.ifi.lmu.de/mirw2007/(retrieved on Oct. 14, 2010).

* cited by examiner

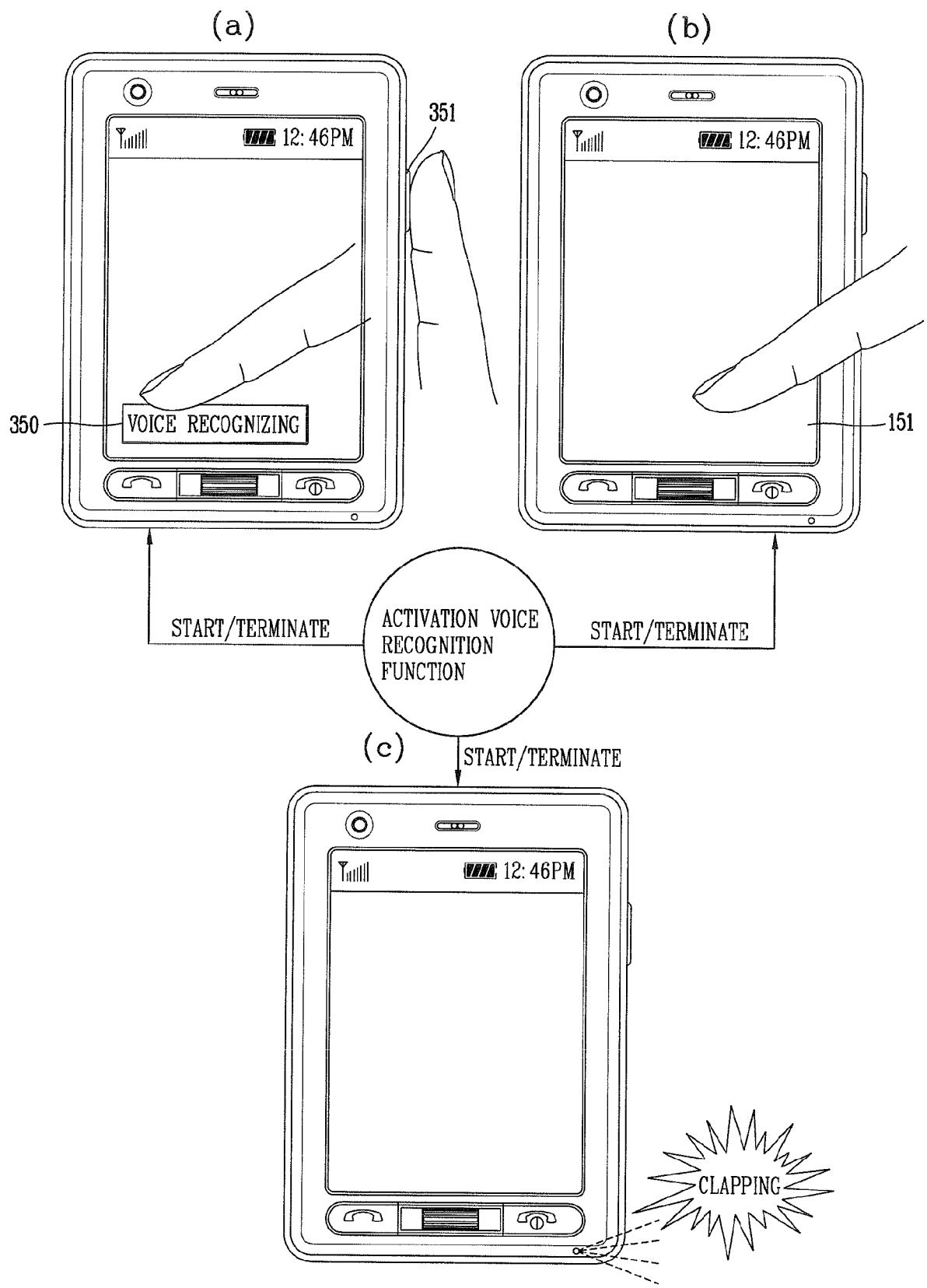

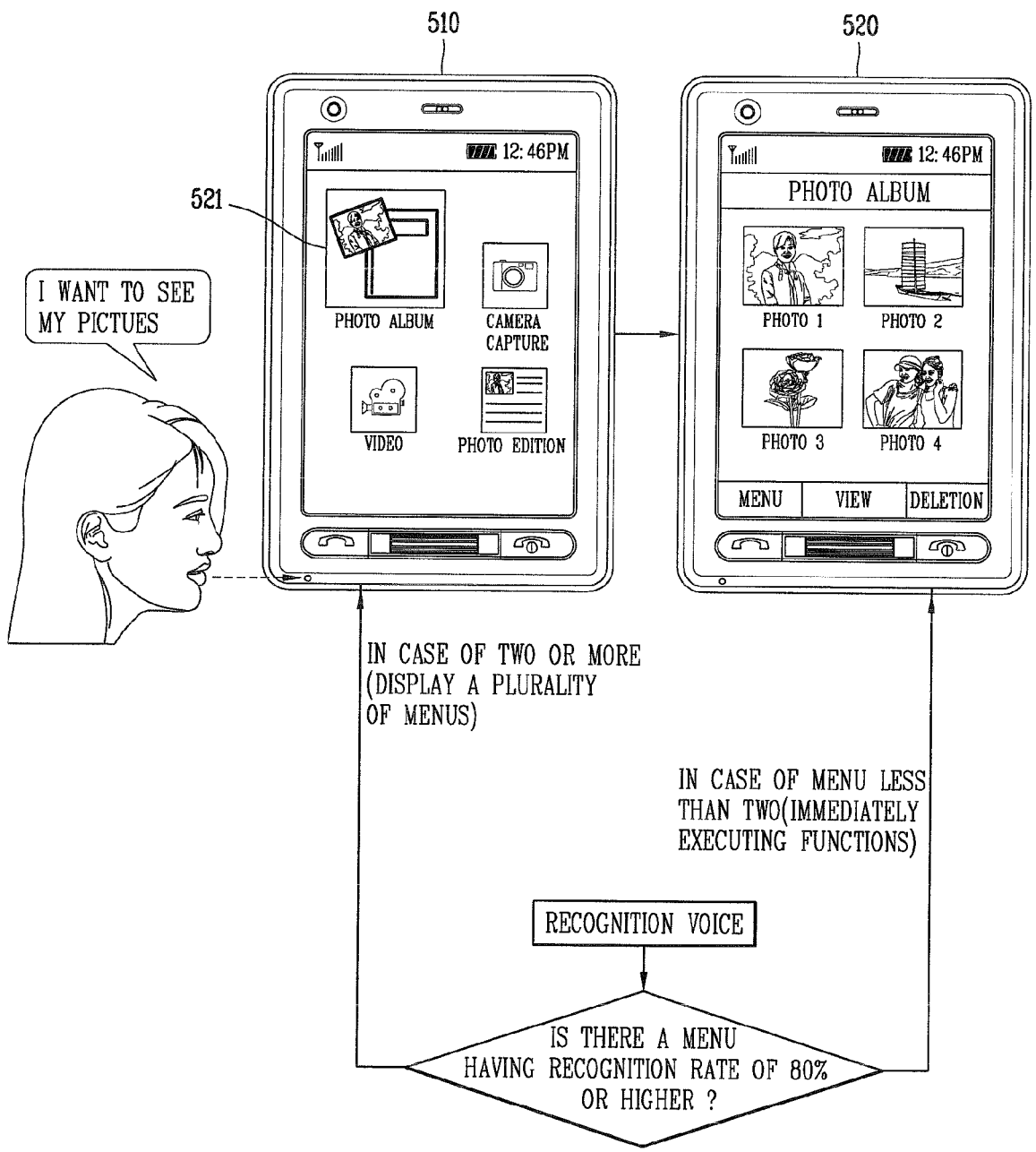

MOBILE TERMINAL AND MENU CONTROL METHOD THEREOF

CROSS REFERENCE TO RELATED APPLICATIONS

This application is a Continuation of application Ser. No. 12/140,107 filed on Jun. 16, 2008, now U.S. Pat. No. 8,150,700 which claims priority to Application No. 10-2008-0032842 filed in the Republic of Korea, on Apr. 8, 2008. The entire contents of all of the above applications are hereby incorporated by reference.

BACKGROUND OF THE INVENTION

1. Field of the Invention

The present invention relates to a mobile terminal and corresponding method that performs operations on the mobile terminal based on voice commands and prior operations performed on the mobile terminal.

2. Description of the Related Art

Mobile terminals now provide many additional services beside the basic call service. For example, user's can now access the Internet, play games, watch videos, listen to music, capture images and videos, record audio files, etc. Mobile terminals also now provide broadcasting programs such that user can watch television shows, sporting programs, videos etc.

Thus, the mobile terminals include sophisticated graphic user interfaces or GUIs that the user can use to access the various functions on the terminal. For example, the user can access a main menu and then select from one of a plurality of submenus such as an email submenu, a calling history submenu, an Internet access submenu, a pictures submenu, etc. Once the user selects a particular submenu, the mobile terminals provide yet another list of submenus or options that the user can select to perform a desired function.

However, the menu systems are formed in a tree diagram such that the user has to perform several intermediary functions in order to select a desired final function. In addition, because the terminal is small in size, the menu options are also small in size, and difficult to see. Touching a particular menu option when the terminal includes a touch screen display also often results in the user simultaneously touching more than one menu item (because the menu items are displayed close together) or the user touching the wrong menu item.

SUMMARY OF THE INVENTION

Accordingly, one object of the present invention is to address the above-noted and other problems.

Another object of the present invention is to provide a mobile terminal and corresponding method that recognizes a meaning of a voice instruction and controls the terminal based on the recognized voice instruction.

Yet another object of the present invention is to provide a mobile terminal and corresponding method that provides a menu or menus to operation different functions of the terminal based on the recognized voice instruction.

To achieve these and other advantages and in accordance with the purpose of the present invention, as embodied and broadly described herein, the present invention provides in one aspect a mobile terminal including an input unit configured to receive an input to activate a voice recognition function on the mobile terminal, a memory configured to store information related to operations performed on the mobile terminal, and a controller configured to activate the voice recognition function upon receiving the input to activate the voice recognition function, to determine a meaning of an input voice instruction based on at least one prior operation performed on the mobile terminal and a language included in the voice instruction, and to provide operations related to the determined meaning of the input voice instruction based on the at least one prior operation performed on the mobile terminal and the language included in the voice instruction and based on a probability that the determined meaning of the input voice instruction matches the information related to the operations of the mobile terminal.

In another aspect, the present invention provides a method of controlling a mobile terminal, which includes receiving an input to activate a voice recognition function on the mobile terminal, activating the voice recognition function upon receiving the input to activate the voice recognition function, and providing operations related to a determined meaning of the input voice instruction based on a at least one prior operation performed on the mobile terminal and a language included in the voice instruction and based on a probability that the determined meaning of the input voice instruction matches information related to the operations of the mobile terminal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIGS. 6(a) to 6(c) are overviews of display screens illustrating a method for selecting activation of a voice recognition function of the mobile terminal according to an embodiment of the present invention;

FIG. 7C is an overview of display screens illustrating a voice recognizing method of a mobile terminal according to an embodiment of the present invention;

DETAILED DESCRIPTION OF THE INVENTION

Reference will now be made in detail to the preferred embodiments of the present invention, examples of which are illustrated in the accompanying drawings.

Figure 1:
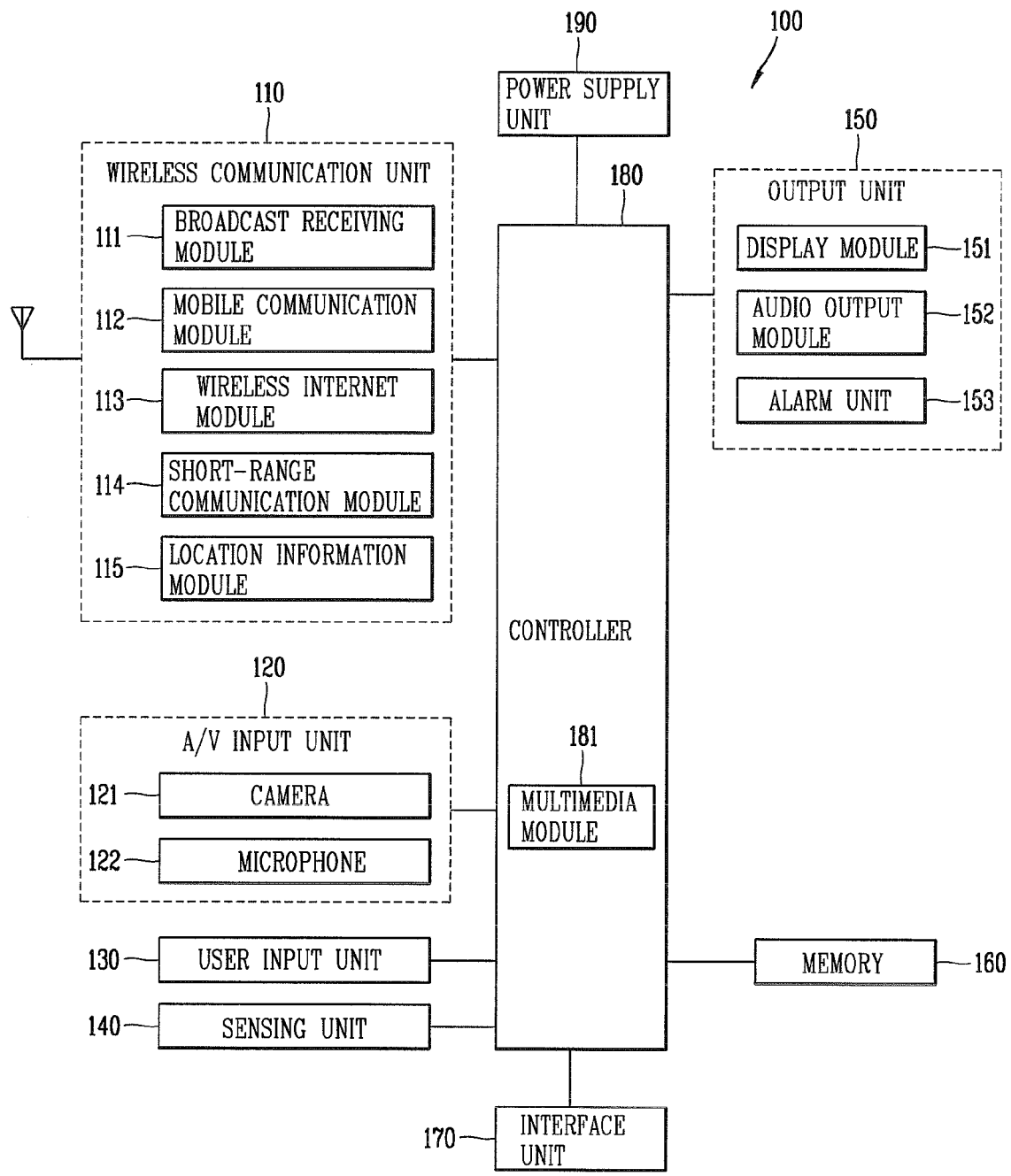
FIG. 1 is a block diagram of a mobile terminal according to an embodiment of the present invention.

FIG. 1 is a block diagram of a mobile terminal 100 according to an embodiment of the present invention. As shown, the mobile terminal 100 includes a wireless communication unit 110 having one or more components which permits wireless communication between the mobile terminal 100 and a wireless communication system or network within which the mobile terminal is located.

For example, the wireless communication unit 110 includes a broadcast receiving module 111 that receives a broadcast signal and/or broadcast associated information from an external broadcast managing entity via a broadcast channel. The broadcast channel may include a satellite channel and a terrestrial channel.

In addition, the broadcast managing entity generally refers to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of digital multimedia broadcasting (DMB) and electronic service guide (ESG) of digital video broadcast-handheld (DVB-H).

In addition, the broadcast signal may be implemented as a TV broadcast signal, a radio broadcast signal, and a data broadcast signal, among others. The broadcast signal may further include a broadcast signal combined with a TV or radio broadcast signal.

The broadcast receiving module 111 is also configured to receive broadcast signals transmitted from various types of broadcast systems. For example, such broadcasting systems include the digital multimedia broadcasting-terrestrial (DMB-T) system, the digital multimedia broadcasting-satellite (DMB-S) system, the digital video broadcast-handheld (DVB-H) system, the data broadcasting system known as media forward link only (MediaFLO®) and the integrated services digital broadcast-terrestrial (ISDB-T) system among others. Receiving multicast signals is also possible. Further, data received by the broadcast receiving module 111 may be stored in a suitable device, such as a memory 160.

The wireless communication unit 110 also includes a mobile communication module 112 that transmits/receives wireless signals to/from one or more network entities (e.g., base station, Node-B). Such signals may represent audio, video, multimedia, control signaling, and data, among others.

Also included is a wireless Internet module 113 that supports Internet access for the mobile terminal. The module 113 may be internally or externally coupled to the terminal. The wireless communication unit 110 also includes a short-range communication module 114 that facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

A position-location module 115 is also included in the wireless communication unit 110 and identifies or otherwise obtains the location of the mobile terminal 100. The position-location module 115 may be implemented using global positioning system (GPS) components which cooperate with associated satellites, network components, and combinations thereof.

In addition, as shown in FIG. 1, the mobile terminal 100 also includes an Audio/video (NV) input unit 120 that provides audio or video signals to the mobile terminal 100. As shown, the A/V input unit 120 includes a camera 121 and a microphone 122. The camera 121 receives and processes image frames of still pictures or video.

Further, the microphone 122 receives an external audio signal while the portable device is in a particular mode, such as a phone call mode, recording mode and voice recognition mode. The received audio signal is then processed and converted into digital data. Also, the portable device, and in particular, the NV input unit 120, typically includes assorted noise removing algorithms to remove noise generated in the course of receiving the external audio signal. In addition, data generated by the NV input unit 120 may be stored in the memory 160, utilized by an output unit 150, or transmitted via one or more modules of the communication unit 110. If desired, two or more microphones and/or cameras may be used.

The mobile terminal 100 also includes a user input unit 130 that generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touch screen display, which will be described in more detail below.

A sensing unit 140 is also included in the mobile terminal 100 and provides status measurements of various aspects of the mobile terminal 100. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, etc.

As an example, when the mobile terminal 100 is a slide-type mobile terminal, the sensing unit 140 may sense whether a sliding portion of the mobile terminal 100 is open or closed. Other examples include the sensing unit 140 sensing the presence or absence of power provided by a power supply 190, the presence or absence of a coupling or other connection between an interface unit 170 and an external device, etc.

Further, the interface unit 170 is often implemented to couple the mobile terminal 100 with external devices. Typical external devices include wired/wireless headphones, external chargers, power supplies, storage devices configured to store data (e.g., audio, video, pictures, etc.), earphones, and microphones, among others. In addition, the interface unit 170 may be configured using a wired/wireless data port, a card socket (e.g., for coupling to a memory card, a subscriber identity module (SIM) card, a user identity module (UIM) card, a removable user identity module (RUIM) card, etc.), audio input/output ports and video input/output ports.

The output unit 150 generally includes various components which support the output requirements of the mobile terminal 100. The mobile terminal 100 also includes a display 151 that visually displays information associated with the mobile terminal 100. For instance, if the mobile terminal 100 is operating in a phone call mode, the display 151 will generally provide a user interface or graphical user interface which includes information associated with placing, conducting, and terminating a phone call. As another example, if the mobile terminal 100 is in a video call mode or a photographing mode, the display 151 may additionally or alternatively display images which are associated with these modes.

Further, the display 151 also preferably includes a touch screen working in cooperation with an input device, such as a touchpad. This configuration permits the display 151 to function both as an output device and an input device. In addition, the display 151 may be implemented using display technologies including, for example, a liquid crystal display (LCD), a thin film transistor-liquid crystal display (TFT-LCD), an organic light-emitting diode display (OLED), a flexible display and a three-dimensional display.

The mobile terminal 100 may also include one or more of such displays. An example of a two-display embodiment is one in which one display is configured as an internal display (viewable when the terminal is in an opened position) and a second display configured as an external display (viewable in both the open and closed positions).

FIG. 1 further shows the output unit 150 having an audio output module 152 which supports the audio output requirements of the mobile terminal 100. The audio output module 152 is often implemented using one or more speakers, buzzers, other audio producing devices, and combinations thereof.

Further, the audio output module 152 functions in various modes including a call-receiving mode, a call-placing mode, a recording mode, a voice recognition mode and a broadcast reception mode. During operation, the audio output module 152 outputs audio relating to a particular function (e.g., call received, message received, and errors).

In addition, the output unit 150 is further shown having an alarm 153, which is used to signal or otherwise identify the occurrence of a particular event associated with the mobile terminal 100. Typical events include a call received, a message received and user input received. An example of such output includes the providing of tactile sensations (e.g., vibration) to a user. For instance, the alarm 153 may be configured to vibrate responsive to the mobile terminal 100 receiving a call or message.

As another example, a vibration is provided by the alarm 153 responsive to receiving user input at the mobile terminal 100, thus providing a tactile feedback mechanism. Further, the various outputs provided by the components of the output unit 150 may be separately performed, or such output may be performed using any combination of such components.

In addition, the memory 160 is generally used to store various types of data to support the processing, control, and storage requirements of the mobile terminal 100. Examples of such data include program instructions for applications operating on the mobile terminal 100, call history, contact data, phonebook data, messages, pictures, video, etc.

Further, the memory 160 shown in FIG. 1 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The terminal 100 also includes a controller 180 that typically controls the overall operations of the mobile terminal 100. For instance, the controller 180 performs the control and processing associated with voice calls, data communications, instant message communications, video calls, camera operations and recording operations. As shown in FIG. 1, the controller 180 may also include a multimedia module 181 for providing multimedia playback functions. The multimedia module 181 may be configured as part of the controller 180, or may be implemented as a separate component.

In addition, a power supply 190 provides power used by the various components for the portable device. The provided power may be internal power, external power, or combinations thereof.

Figure 2:
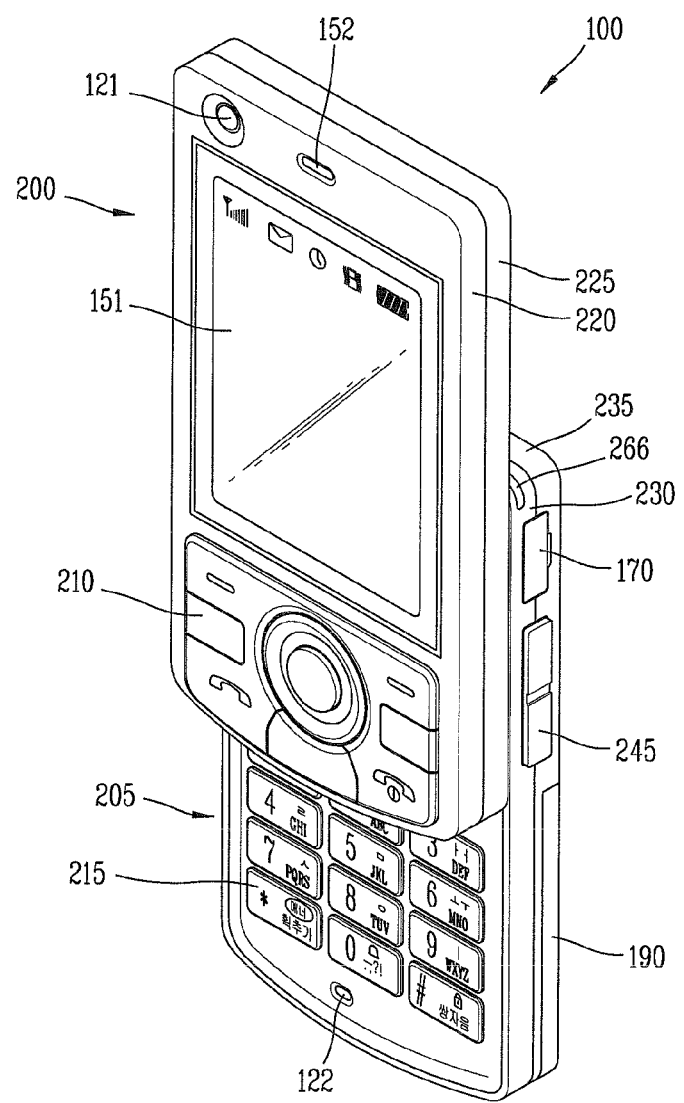
FIG. 2 is a front perspective view of a mobile terminal according to an embodiment of the present invention.

Next, FIG. 2 is a front side view of the mobile terminal 100 according to an embodiment of the present invention. As shown in FIG. 2, the mobile terminal 100 includes a first body 200 configured to slideably cooperate with a second body 205. The user input unit 130 described in FIG. 1 may include a first input unit such as function keys 210, a second input unit such as a keypad 215, and a third input unit such as side keys 245.

The function keys 210 are associated with the first body 200, and the keypad 215 is associated with the second body 205. The keypad 215 includes various keys (e.g., numbers, characters, and symbols) to enable a user to place a call, prepare a text or multimedia message, and otherwise operate the mobile terminal 100.

In addition, the first body 200 slides relative to the second body 205 between open and closed positions. In a closed position, the first body 200 is positioned over the second body 205 in such a manner that the keypad 215 is substantially or completely obscured by the first body 200. In the open position, user access to the keypad 215, as well as the display 151 and function keys 210, is possible. The function keys 210 are convenient to a user for entering commands such as start, stop and scroll commands.

Further, the mobile terminal 100 is operable in either a standby mode (e.g., able to receive a call or message, receive and respond to network control signaling), or an active call mode. Typically, the mobile terminal 100 functions in a standby mode when in the closed position, and an active mode when in the open position. However, the mode configuration may be changed as required or desired.

In addition, the first body 200 is formed from a first case 220 and a second case 225, and the second body 205 is formed from a first case 230 and a second case 235. The first and second cases are preferably formed from a suitably ridge material such as injection molded plastic, or formed using metallic material such as stainless steel (STS) and titanium (Ti).

If desired, one or more intermediate cases may be provided between the first and second cases of one or both of the first and second bodies 200 and 205. In addition, the first and second bodies 200 and 205 are typically sized to receive electronic components used to support the operation of the mobile terminal 100.

Also, the first body 200 includes the camera 121 and the audio output unit 152, which is configured as a speaker, positioned relative to the display 151. The camera 121 may also be constructed in such a manner that it can be selectively positioned (e.g., rotated, swiveled, etc.) relative to the first body 200.

Further, the function keys 210 are positioned adjacent to a lower side of the display 151. As discussed above, the display 151 can be implemented as an LCD or OLED. The display 151 may also be configured as a touch screen having an underlying touchpad which generates signals responsive to user contact (e.g., finger, stylus, etc.) with the touch screen.

Also, the second body 205 includes the microphone 122 positioned adjacent to the keypad 215, and side keys 245, which are one type of a user input unit, positioned along the side of the second body 205. Preferably, the side keys 245 are configured as hot keys, such that the side keys 245 are associated with a particular function of the mobile terminal 100. As shown, the interface unit 170 is positioned adjacent to the side keys 245, and the power supply 190 in a form of a battery is located on a lower portion of the second body 205.

Figure 3:
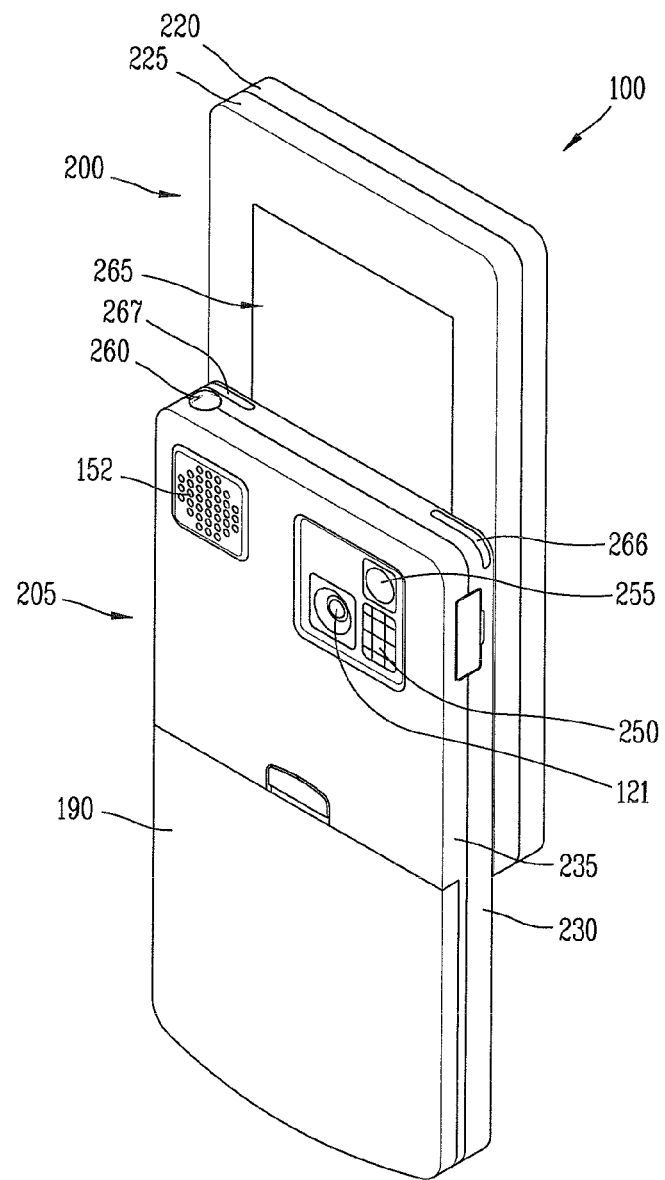
FIG. 3 is a rear perspective view of the mobile terminal in FIG. 2.

FIG. 3 is a rear side view of the mobile terminal 100 shown in FIG. 2. As shown in FIG. 3, the second body 205 includes the camera 121, and an associated flash 250 and mirror 255. The flash 250 operates in conjunction with the camera 121 of the second body 205, and the mirror 255 is useful for assisting a user to position the camera 121 in a self-portrait mode. In addition, the camera 121 of the second body 205 faces a direction which is opposite to a direction faced by the camera 121 of the first body 200 shown in FIG. 2.

In addition, each of the cameras 121 of the first and second bodies 200 and 205 may have the same or different capabilities. For example, in one embodiment, the camera 121 of the first body 200 operates with a relatively lower resolution than the camera 121 of the second body 205. Such an arrangement works well during a video conference call, for example, in which reverse link bandwidth capabilities may be limited. Further, the relatively higher resolution of the camera 121 of the second body 205 (FIG. 3) is useful for obtaining higher quality pictures for later use.

The second body 205 also includes the audio output module 152 configured as a speaker, and which is located on an upper side of the second body 205. The audio output modules of the first and second bodies 200 and 205 may also cooperate together to provide stereo output. Moreover, either or both of these audio output modules may be configured to operate as a speakerphone.

The terminal 100 also includes a broadcast signal receiving antenna 260 located at an upper end of the second body 205. The antenna 260 functions in cooperation with the broadcast receiving module 111 (FIG. 1). If desired, the antenna 260 may be fixed or configured to retract into the second body 205. Further, the rear side of the first body 200 includes a slide module 265, which slideably couples with a corresponding slide module located on the front side of the second body 205.

In addition, the illustrated arrangement of the various components of the first and second bodies 200 and 205 may be modified as required or desired. In general, some or all of the components of one body may alternatively be implemented on the other body. Further, the location and relative positioning of such components may be positioned at locations which differ from those shown by the representative figures.

In addition, the mobile terminal 100 of FIGS. 1-3 may be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include, for example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of a non-limiting example only, further description will relate to a CDMA communication system, but such teachings apply equally to other system types.

Figure 4:
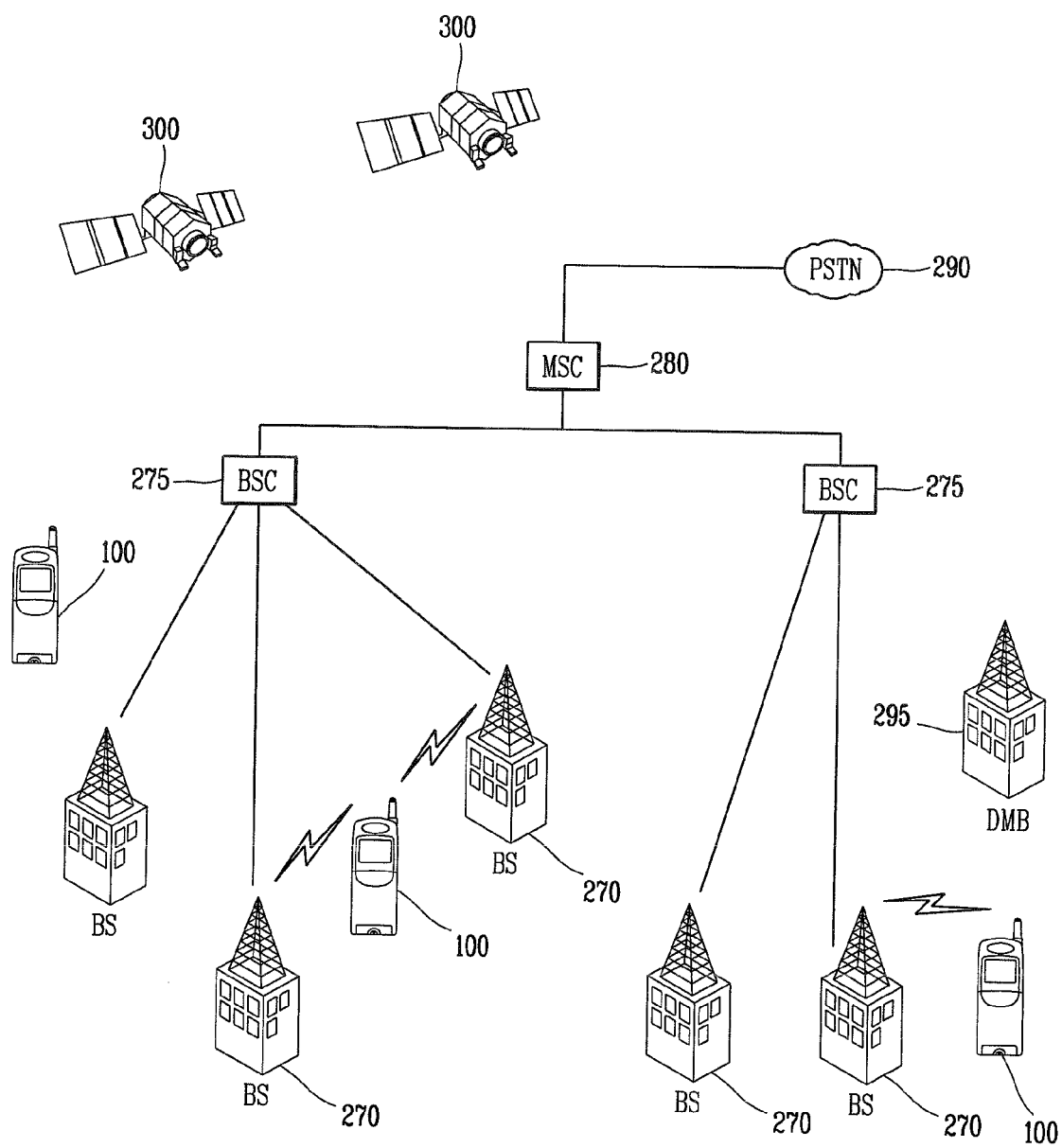
FIG. 4 is a block diagram of a wireless communication system operable with a mobile terminal in FIGS. 1-3 according to an embodiment of the present invention.

Next, FIG. 4 illustrates a CDMA wireless communication system having a plurality of mobile terminals 100, a plurality of base stations 270, a plurality of base station controllers (BSCs) 275, and a mobile switching center (MSC) 280.

The MSC 280 is configured to interface with a public switch telephone network (PSTN) 290, and the MSC 280 is also configured to interface with the BSCs 275. Further, the BSCs 275 are coupled to the base stations 270 via backhaul lines. In addition, the backhaul lines may be configured in accordance with any of several interfaces including, for example, E1/T1, ATM, IP, PPP, Frame Relay, HDSL, ADSL, or xDSL. Further, the system may include more than two BSCs 275.

Also, each base station 270 may include one or more sectors, each sector having an omnidirectional antenna or an antenna pointed in a particular direction radially away from the base station 270. Alternatively, each sector may include two antennas for diversity reception. In addition, each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some instances, the term "base station" may be used to refer collectively to a BSC 275, and one or more base stations 270.

The base stations 270 may also be denoted as "cell sites." Alternatively, individual sectors of a given base station 270 may be referred to as cell sites. Further, a terrestrial digital multimedia broadcasting (DMB) transmitter 295 is shown broadcasting to mobile terminals 100 operating within the system.

In addition, the broadcast receiving module 111 (FIG. 1) of the mobile terminal 100 is typically configured to receive broadcast signals transmitted by the DMB transmitter 295. Similar arrangements may be implemented for other types of broadcast and multicast signaling as discussed above.

FIG. 4 further illustrates several global positioning system (GPS) satellites 300. Such satellites facilitate locating the position of some or all of the mobile terminals 100. In FIG. 4, two satellites are shown, but positioning information may be obtained with greater or fewer satellites.

In addition, the position-location module 115 (FIG. 1) of the mobile terminal 100 is typically configured to cooperate with the satellites 300 to obtain desired position information. However, other types of position detection technology, such as location technology that may be used in addition to or instead of GPS location technology, may alternatively be implemented. Some or all of the GPS satellites 300 may alternatively or additionally be configured to provide satellite DMB transmissions.

Further, during typical operation of the wireless communication system, the base stations 270 receive sets of reverse-link signals from various mobile terminals 100. The mobile terminals 100 engage in calls, messaging, and other communications.

In addition, each reverse-link signal received by a given base station 270 is processed within that base station 270, and the resulting data is forwarded to an associated BSC 275. The BSC 275 provides call resource allocation and mobility management functionality including soft handoffs between the base stations 270.

Further, the BSCs 275 also route the received data to the MSC 280, which provides additional routing services for interfacing with the PSTN 290. Similarly, the PSTN interfaces with the MSC 280, and the MSC 280 interfaces with the BSCs 275. The BSCs 275 also control the base stations 270 to transmit sets of forward-link signals to the mobile terminals 100.

In the following description, a control method applicable to the above-configured mobile terminal 100 is explained with respect to various embodiments. However, the following embodiments can be implemented independently or through combinations thereof. In addition, in the following description, it is assumed that the display 151 includes a touch screen. Further, the touch screen or its screen will be indicated by the reference number '400'.

Figure 5:
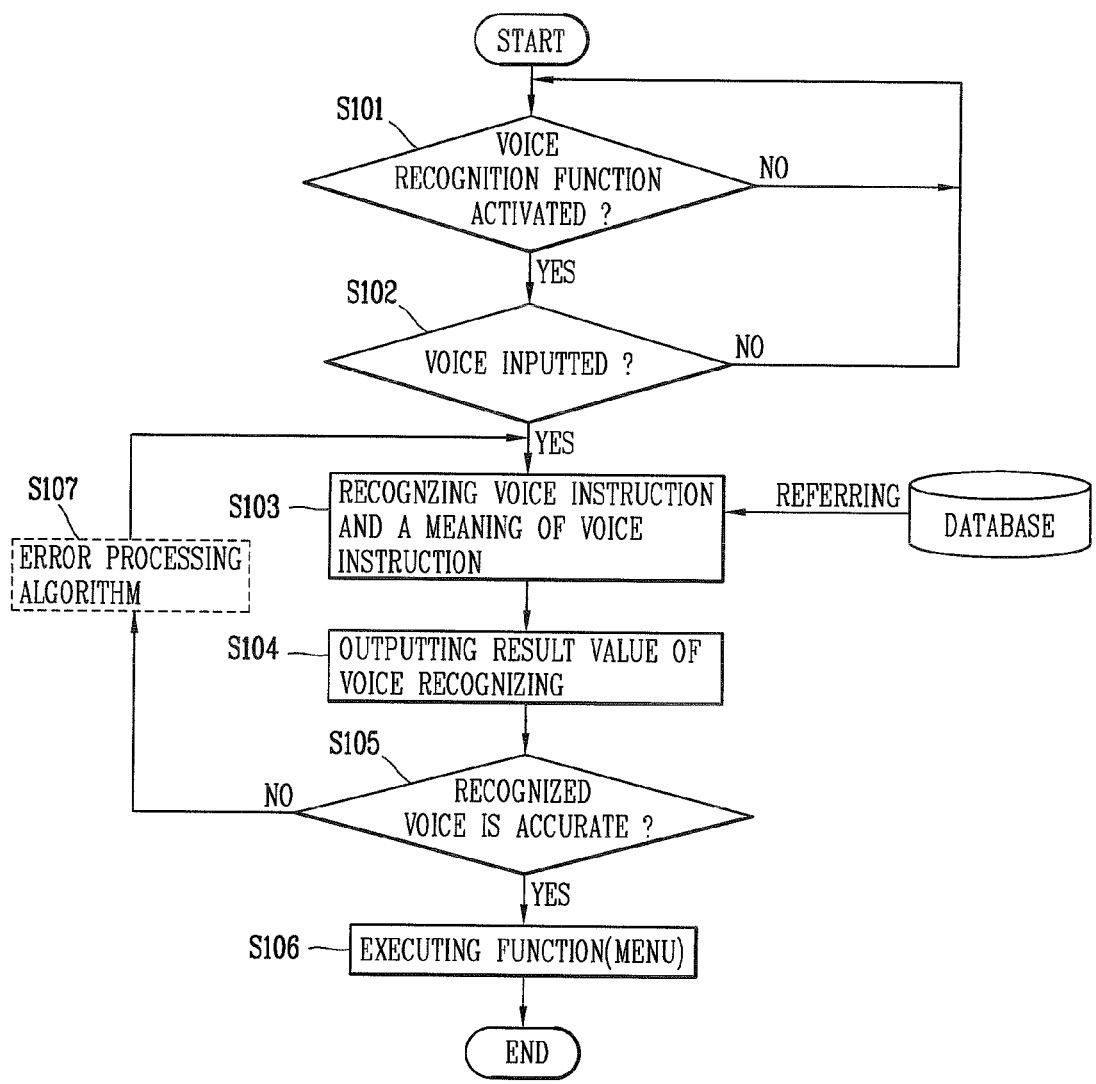
FIG. 5 is a flow chart illustrating a method of controlling a mobile terminal according to an embodiment of the present invention.

FIG. 5 is a flow chart illustrating a method of controlling a mobile terminal according to an embodiment of the present invention. FIG. 1 will also be referred to in this description. As shown, the controller 180 determines when the voice recognition function of the mobile terminal is activated (S101). When the voice recognition function is activated (Yes in S101), the controller 180 receives a voice instruction input by a user (hereinafter referred to as 'voice instruction') (S102). Then, when the controller 180 recognizes that the voice instruction has been input by the user (Yes in S102), the controller 180 determines a meaning of the recognized voice instruction (S103).

Further, to activate the voice recognition function of the present embodiment, the user can select a particular button or touch a particular portion of the touch screen included with the mobile terminal. Having the user physically activate the voice recognition function is particularly advantageous, because the user is more aware they are about to use voice commands to control the terminal. That is, because the user has to first perform a physical manipulation of the terminal, he or she intuitively recognizes they are going to input a voice command or instruction into the terminal, and therefore may speak more clearly or slowly to thereby activate a particular function.

Thus, because the user speaks more clearly or more slowly, for example, the probability of accurately recognizing the voice instruction increases. That is, the activation of the voice recognition function is performed by a physical manipulation of a button on the terminal rather than activating the voice recognition function by speaking into the terminal.

Further, the controller 180 may start or terminate activation of the voice recognition function based on how many times the user touches a particular button or portion of the touch screen, how long the user touches a particular button or portion of the touch screen, etc. The user can also set how the controller 180 is to activate the voice recognition function using an appropriate menu option provided by the present invention. For example, the user can select a menu option on the terminal that includes 1) set activation of voice recognition based on X number of times the voice activation button is selected, 2) set activation of voice recognition based on an X amount of time the voice activation button is selected, 3) set activation of voice recognition when the buttons X and Y are selected, etc. The user can then enter the values of X and Y in order to variably set how the controller 180 determines the voice activation function is activated. Thus, according to an embodiment of the present invention, the user is actively engaged with the voice activation function of their own mobile terminal, which increases the probability that the controller 180 will determine the correct function corresponding to the user's voice instruction, and which allows the user to tailor the voice activation function according to his or her needs.

The controller 180 may also maintain the activated state of the voice recognition function while the designated button(s) are touched or selected, and stop the voice recognition function when the designated button(s) are released. Alternatively, the controller 180 can maintain the activation of the voice recognition function for a predetermined time period after the designated button(s) are touched or selected, and stop or terminate the voice recognition function when the predetermined time period ends. In yet another embodiment, the controller 180 can store received voice instructions in the memory 160 while the voice recognition function is maintained in the activated state.

Further, the controller 180 can determine the meaning of the voice instruction immediately after the voice recognition function is terminated, or can determine the meaning of the voice instruction simultaneously while the user is inputting voice instructions. In addition, to determine the meaning of the voice instruction, the controller 180 can analyze words, a keyword, a sentence structure, etc., used in the input voice instruction and determine a content or a meaning of the voice instruction.

Further, the controller 180 may also store information related to functions, services or menus provided in the mobile terminal in a database of the memory 160 in order to determine the meaning of the voice instruction. In addition, to improve the probability of accurately detecting the user's voice instruction, the information stored in the database may be updated using a learning or artificial intelligence method. Previous operations performed on the mobile terminal may also be stored in the database. For example, the user may open their terminal, and most of the time, check their e-mails before performing any other operation.

Thus, the controller 180 can use these prior operations to increase the probability of determining the meaning of the user's voice instruction. The user can also input a same voice instruction when first turning on or opening their mobile terminal. These prior operations can also be stored together with the input voice instruction and be used by the controller 180 to determine the meaning of an input instruction.

Thus, the prior operations performed on the terminal include activation status of the terminal (e.g., during the standby mode, during a phone call, during a video phone call, during an e-mail session, during an instant message session, closing the terminal etc.), and also include prior instructions input by the user. For example, to listen to music, the user may previously close the terminal and then input the instruction, "play my music." The controller 180 can then use the state of the mobile terminal (i.e., it being in a closed state) to help in determining what the user's input voice instruction is.

Returning to FIG. 5, when the controller 180 determines the meaning of the voice instruction using the information in the database, the controller 180 outputs a corresponding result value (S104). That is, the result value may include a control signal for executing a function corresponding to the recognized voice instruction or for controlling a particular element. The result value may also correspond to data information for displaying a menu or menus related to the recognized instruction.

Further, the user may input the voice instruction as an accurate designation of a particular menu (e.g., image capturing, voice call, message transmission, etc.) or using a natural language (e.g., show me photo, save battery, etc.). Also, the natural language instruction may or may not include an accurate designation related to a particular menu.

In addition, the natural language is speech generally used by people in daily life, which is discriminated from an artificial language (which is artificially created), and can be processed using a natural language processing algorithm. Further, in FIG. 5, the controller 180 then determines if it can recognize the voice instruction input by the user (S105).

For example, the controller 180 can determine if it can recognize the voice instructions to a probability that is above a particular threshold (e.g., 80%). If the controller 180 can not determine the meaning of the voice instruction that satisfies the particular threshold, the controller 180 can perform additional error processing (S107) and then repeat steps S103 to S105.

However, if the controller 180 can recognized the voice instructions that satisfy the particular threshold, the controller 180 can advantageously display a plurality of menus that satisfy the particular threshold (e.g., having greater than a particular recognition rate of 80% or higher) (S106). The user can visually see the displayed menus and then selected one of the displayed menus.

This feature is particularly advantageous because again the user is actively involved in the voice recognition function. In more detail, rather than displaying or outputting a message to the user that the controller 180 can not clearly determine the meaning of the voice instruction, the controller 180 advantageously outputs a plurality of menus that have a probability of being accurate greater than a particular threshold (e.g., 80%). For example, if the user enters the voice instruction "save battery," but the controller 180 can only determine the instruction "save" (e.g., because of background noise, poor reception, etc.), the controller 180 can display particular menu or options that related to the keyword "Save." That is, the controller 180 can display a photo menu, a battery menu, and an email menu, because each of these menus include a "save" feature. Thus, the user can then select the appropriate menu from the plurality of displayed menus.

Further, as discussed above, the controller 180 can use the previous operations of the terminal in determining the meaning of the input voice instructions. The controller 180 can also use a physical state of the terminal to help in determining the meaning of the input voice instructions. For example, the controller 180 can advantageously use information about the battery status (e.g., a low battery status) when deciding the meaning of the input voice instructions.

In addition, as the type of receiving user acknowledgement, a message, a voice or a display position or form (shape or size) of a menu may be used, and the response type may be a user voice, a particular button or a touch input. Further, as discussed above, if the recognition rate of the input voice instruction is lower than a particular threshold, the controller 180 can perform an error processing operation (S107).

Further, during the error processing operation, the controller 180 may receive an additional voice instruction from the user, or as discussed above, may display a plurality of menus having more than a certain recognition rate or probability rate. The controller 180 also determines a number of the recognized functions or menus that have greater than a particular probability. If the recognized functions or a menus having more than a certain recognition rate is smaller than a particular number (for example, if there is only one function or one menu), the controller 180 automatically executes the single function or the menu.

Next, FIGS. 6(a) to 6(c) are display screens illustrating a user for activating the voice recognition function of the mobile terminal according to an embodiment of the present invention. In addition, as discussed above, the present invention advantageously allows a user to determine when the voice activation function is to be initiated based on a physical manipulation by a user. Thus, the user is more aware about his surroundings (e.g., whether he is speaking in a quit environment, etc.), about the tone and level of his voice, about the natural or other type of language he is using, etc. Therefore, the user is likely to be more careful when inputting voice instructions, which leads to a higher probability of the controller 180 accurately determining the meaning of the voice instruction.

Further, another advantage of allowing the user to manually activate the voice recognition function by touching or selecting a button on the terminal is that the amount of battery power is reduced. That is, the voice recognition function consumes multiple resources of the mobile terminal, and when the activated state of the voice recognition function is continuously operated in the standby state (or idle state), the overall power of the terminal is continuously consumed.

In more detail, when the controller 180 is configured to receive an activation signal for activating the voice recognition function via the user speaking into the terminal (rather than the user selecting a particular button), the controller 180 must continuously operate the voice recognition function in an active state and wait for the user to begin speaking (which would indicate the voice recognition is started). This continuous operation of waiting for the user's voice input to being the voice recognition function continuously decreases the available power of the terminal.

Thus, in order to prevent power consumption and resource consumption of the mobile terminal, the controller 180 advantageously controls the starting and termination of the voice recognition function. In one example, and as shown in FIG. 6(a), the user input unit 130 of the mobile terminal includes a soft button 350 on the display unit 151 that the user can touch to start and stop the voice activation function. Further, the software button may have a button shape or may be an icon of a particular shape. The soft button 350 may also be replaced with a hard button 351 disposed on a side of the terminal, for example, as shown in FIG. 6(a).

In another example, and as shown in FIG. 6(b), an arbitrary portion of the display unit 151 can used to activate and deactivate the voice recognition function without displaying a button or icon on the display unit 151. In still another example, and as shown In FIG. 6(c), a particular sound may be input via the microphone 122 of the mobile terminal to control activation and termination of the voice recognition function.

In more detail, the particular sound may be an impact sound having more than a particular sound level such as a sound of the user clapping. The controller 180 then detects the impact sound using an algorithm or circuit for determining the level of the sound input through the microphone 122. That is, the algorithm or the circuit for detecting the impact sound is configured to detect a sound of more than a pre-set particular level and not to consume a significant amount of resources or power of the mobile terminal compared with the voice recognition function.

The user may also advantageously set what particular impact sound is to be used for activating the voice recognition function. For example, the user can select an appropriate menu option provided by the terminal of the present invention, and then clap two times or three times to inform the controller 180 that that particular amount of clapping sounds is to be used to activate the voice recognition function. The user may also set any other sound as the sound for activating the voice recognition function.

In addition, the controller 180 may drive the voice recognition function in a plurality of modes. For example, the controller 180 may discriminately drive the voice recognition function in a first mode in which the sound of more than the particular level activates the voice recognition function and in a second mode in which a voice instruction is received and its content or meaning is determined. Namely, if the sound of more than the particular level is detected in the first mode, the controller 180 executes the second mode to activate the voice instruction recognizing function.

Further, in another embodiment, the controller 180 starts activating the voice recognition function upon receiving body information from a user. In more detail, the body information includes a hand signal or a gesture of the user. The sensing unit 140 can be used to detect the body information of the user. In another embodiment, the controller 180 starts activating the voice recognition function upon receiving a radio signal of a short distance or a remote area by using a wireless device.

In addition, the controller 180 can receive the radio signal via the wireless communication unit 110, and receive the hand signal or the gesture of the user through the sensing unit 140. In these embodiments, the wireless communication unit 110 for receiving a signal for activating the voice recognition function, the user input unit 130, and the sensing unit 140 may be collectively referred to as an activation signal input unit.

Further, as discussed above, the controller 180 terminates or stops the voice recognition function after a predetermined time period, upon receiving a termination signal from the user, etc. in order to reduce power consumption and resource consumption of the mobile terminal. For this purpose, the termination signal can correspond to a touched or pressed button, touching a particular portion of the touch screen, an impact sound, a radio signal, or body information from the user, in a same or similar manner for starting activation of the voice recognition function.

In more detail, the controller 180 can start the activation of the voice recognition function, maintain the activated state of the voice recognition function during a particular time period, and automatically terminate the activated state of the voice recognition function when the particular time period lapses. Alternatively, the controller 180 can maintain the activated state of the voice recognition function while a button or a touch is continuously input, and terminate the activated state of the voice recognition function when the input is released. In another example, the controller 180 can terminate the voice activation function if the user does not speak into the terminal for longer than a particular time period.

Figure 7A:
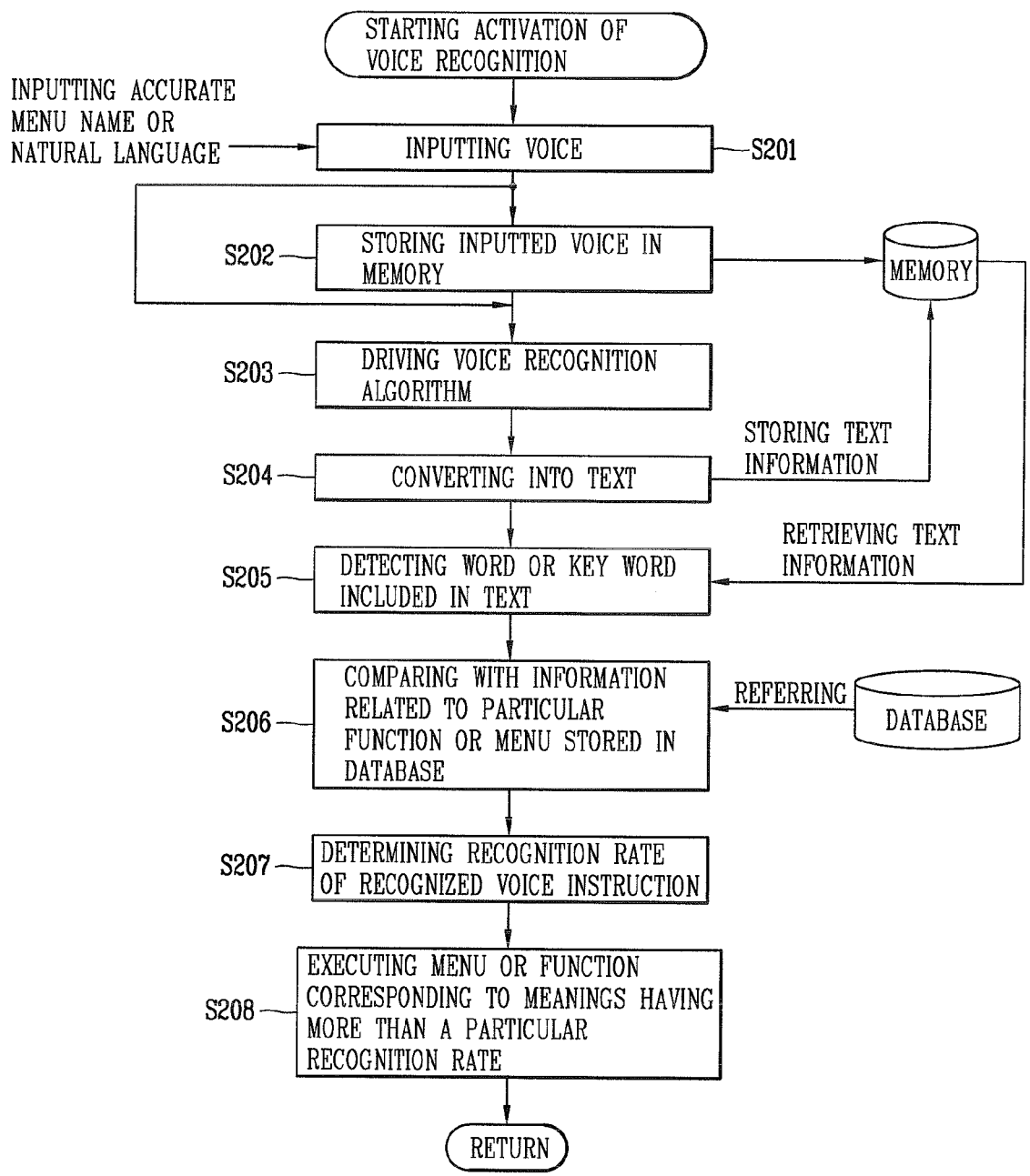
FIG. 7A is a flow chart illustrating a voice recognizing method of a mobile terminal according to an embodiment of the present invention.

Next, FIG. 7A is a flow chart illustrating a voice recognizing method according to another embodiment of the present invention. FIG. 1 will also be referred to in this description. As shown in FIG. 7A, when the voice recognition function is input (S201), the controller 180 stores the input voice instruction in the memory 160 (S202), and processes the voice instruction according to a particular voice recognition algorithm (S203).

Then, according to the voice recognition algorithm, the controller 180 converts the input voice instructions into text information and stores the converted text information in an arbitrary region of the memory 160 (S204). Thereafter, the controller 180 processes the text information to determine a meaning of the instruction. Further, the controller 180 preferably determines the meaning of the voice instruction at the same time when the voice instructions are input.

However, and as mentioned above, the controller 180 can also determine the meaning of the voice instructions after the user finishes inputting the voice instructions. For example, if the user does not input a voice instruction for a pre-set particular time period, the controller 180 can determine that the user has completed inputting the voice instructions, and then start the process of determining the meaning of the voice instructions.

Next, as shown in FIG. 7A, the controller 180 detects particular words or keywords included in the text information to determine the meaning of the voice instruction, (S205), and compares the detected words or keywords with information related to various functions and menus stored in a particular database of the mobile terminal (S206). Further, when the same or similar words or keywords are stored in the database, a recognition rate of the voice instruction can be determined by the number of the corresponding words or keywords (S207).

Further, the information for determining the recognition rate may not be limited to the information of the number of the words or the keywords included in the voice instruction. That is, a value for determining a recognition rate may be differently set for each keyword, so that even if the number of words or keywords is small, the recognition rate may vary by a keyword with a high recognition rate.

Also, the voice recognition rate is information indicating whether the meaning of the recognized voice instruction is accurate or not. In more detail, if the name of a particular menu is accurately input, a 100% recognition rate could be obtained. However, if a voice instruction is received in a natural language, a meaningless word may be included in the voice instruction and each user may differently pronounce the same word, so it is difficult to obtain a 100% recognition rate virtually.

Thus, an embodiment of the present invention advantageously considers a recognition rate that is higher than a particular value (e.g., 80%) to be accurate. Therefore, if there are several meanings determined at a similar recognition rate (namely, the recognition rates are similar, but the voice instruction may be translated to have various meanings), the controller 180 displays a plurality of executable menus that correspond to the recognition rates above the predetermined threshold so that the user may select one of the displayed menus (S208).

Figure 7B:
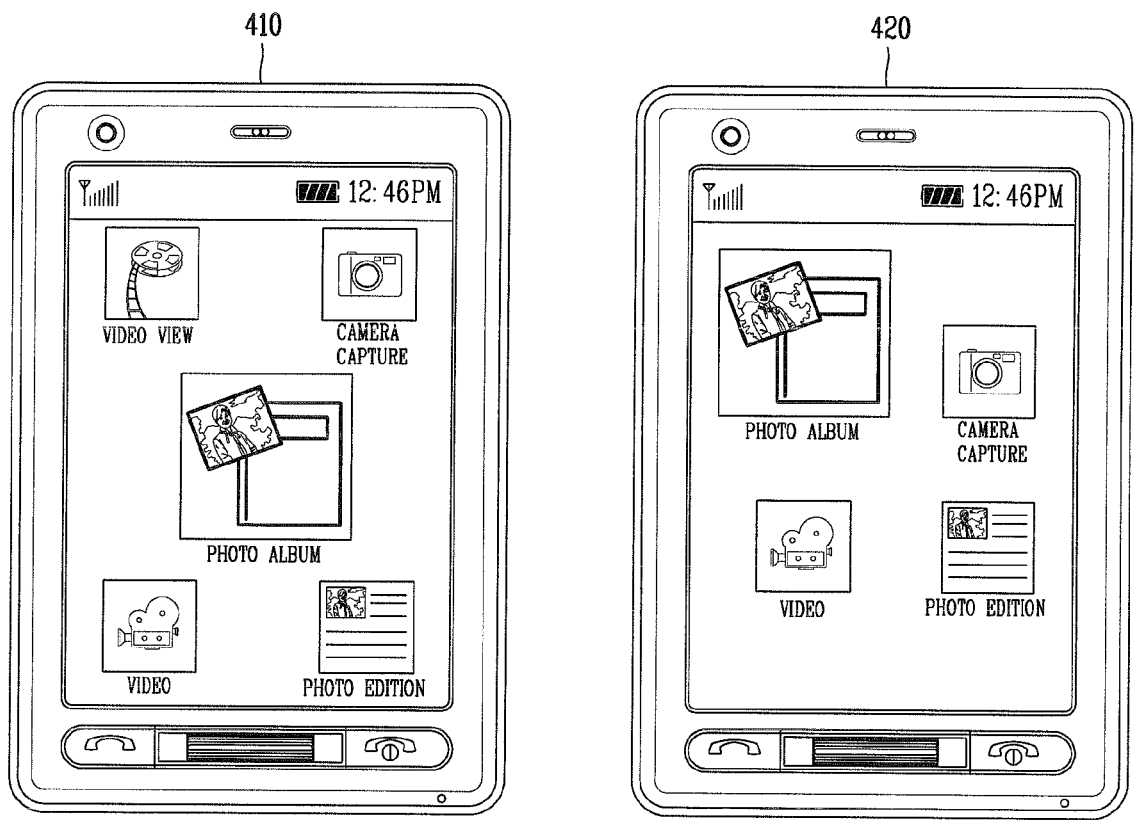
FIG. 7B is an overview of display screens including displayed menus based on a voice recognition rate of a mobile terminal according to another embodiment of the present invention.

Further, the controller 180 may also display the menus in a priority order with the order starting from a menu with the highest recognition rate. For example, and as shown in FIG. 7B, a menu icon with the highest recognition rate may be displayed at a central portion of the display screen 410. Alternatively, and as shown in FIG. 7B, the menu icon with the highest recognition rate may be displayed to be larger, darker or highlighted on the display screen 420. The displayed highest recognition rate menu may also be displayed in a blinking manner.

Further, to improve the recognition rate, if a menu is frequently selected by the user, the controller 180 can learn or remember the number of selections, and use this learned information to change a recognition rate with respect to a particular menu. Thus, a recognition rate may change with respect to a voice instruction input with a similar or the same pronunciation or content.

Next, FIG. 7C is an overview of displays screens for explaining a voice recognizing method according to an embodiment of the present invention. As shown, when the user inputs a voice instruction 'I want to see my pictures' in a natural language, the controller 180 detects meaningful words or keywords (e.g., see, picture) from the sentence forming the voice instruction and compares the words with the information stored in the database of the mobile terminal.

Further, whether or not the detected words or keywords are meaningful words may be determined by the parts of speech,. Alternatively, only a particular pre-set keyword may be detected as a meaning word. The controller 180 then searches the database for information corresponding to the meaningful words or keywords.

In addition, the database may include a plurality of keyword information related to various menus or functions of the mobile terminal. For example, as keyword information corresponding to a 'photo album', a plurality of keyword information such as a lower menu of a camera menu, a 'photo picture', 'video', 'album', etc., may be stored correspondingly in addition to the accurate 'photo album'.

As shown in the display screen 510 in FIG. 7C, when there is no information related to a menu or a function which is identical to the voice instruction, the controller 180 displays a plurality of menus each having a recognition rate higher than a particular value. As discussed above, the controller 180 displays a menu icon 521 having the highest recognition rate to be larger or darker than the other displayed items.

Further, the display screen 520 in FIG. 7C illustrates the controller 180 automatically executing a corresponding menu function having a recognition rate higher than a particular value when there is only one menu having the recognition rate higher than the particular value. Further, the controller 180 may output the voice instruction of which meaning has been determined as a text or other type of message or by a voice message.

Figure 7D:
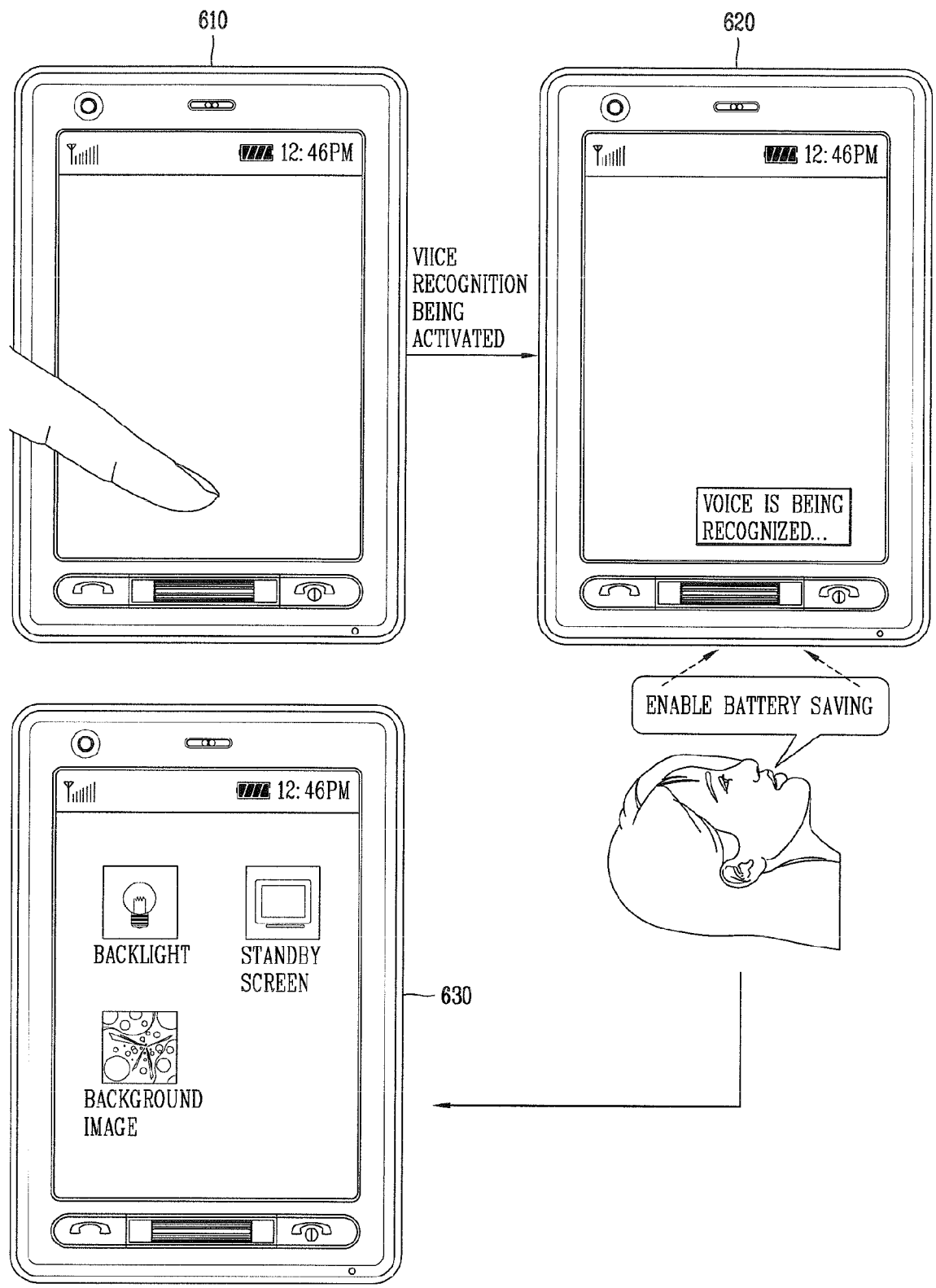
FIG. 7D is an overview of display screens illustrating a voice recognizing method of a mobile terminal according to an embodiment of the present invention.

FIG. 7D is an overview of displays screens for explaining a voice recognizing method according to yet another embodiment of the present invention. In this embodiment, the user first activates the voice recognition function by touching the display screen 610, and then enters the voice instruction 'Enable battery saving' in a natural language as shown in the display screen 620. The controller 180 then detects meaningful words or keywords (e.g., battery, saving) in the sentence forming the voice instruction and compares the words with the information stored in the database to determine their meanings.

In this embodiment, however, because there is no menu exactly corresponding to the voice instruction, the controller 180 displays a plurality of menus (e.g., a background image, a backlight, a standby screen, etc.) related to the function of reducing power consumption of a battery as shown in the display screen 630.

Further, as discussed above, at least one of size, position, color and contrast of the plurality of menus may be differently displayed or highlighted according to the order of high recognition rate. For example, the recognition rates of menus with a high user selection may be displayed to be distinguished from other menus.

Figure 8:
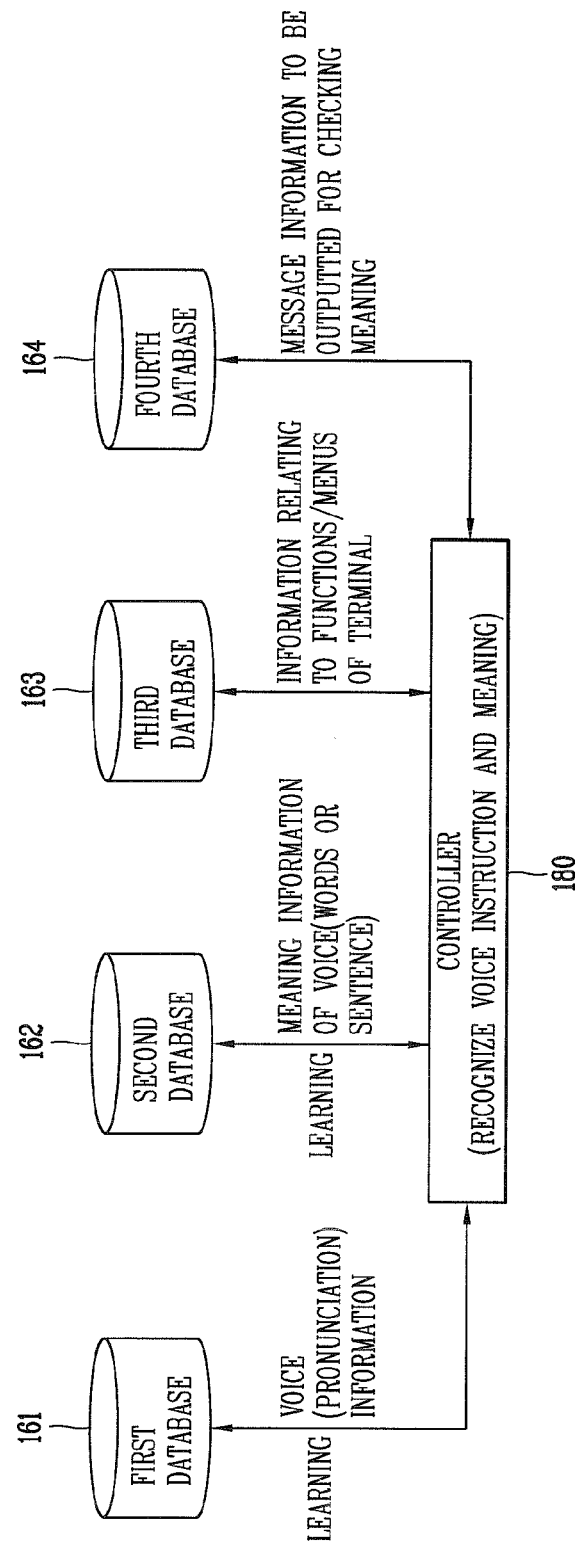
FIG. 8 is a block diagram illustrating a database system used in a voice recognition method of the mobile terminal according to an embodiment of the present invention.

Next, FIG. 8 is a block diagram illustrating databases for voice recognition according to an embodiment of the present invention. The databases include stored information that is used by the controller 180 for determining the meaning of a voice instruction. Thus, a plurality of databases may be configured according to characteristics of each information. In addition, each database configured according to characteristics of each information may be updated through a continuous learning process under the control of the controller 180.

Further, the learning process for the databases refers to matching a voice pronounced by the user to a corresponding word. For example, if the user has pronounced 'fifteen' but the controller 180 recognizes the word as 'fifty', the user may correct 'fifty' into 'fifteen', so that the controller 180 recognizes the same pronunciation made afterwards as 'fifteen'.

Therefore, through this learning process, a plurality of voice information may be matched to each information of the databases. For example, the databases may include a first database 161 for storing voice information allowing the user's voice input through the microphone to be recognized by format, syllable, or morpheme, a second database 162 for storing information allowing the controller 180 to determine the overall meaning of a voice instruction based on the recognized voice information, a third database 163 for storing information related to a menu for performing a function or a service of the mobile terminal, and a fourth database 164 for storing a message or voice information to be output from the mobile terminal for user's acknowledgement with respect to a meaning of the determined voice instruction.

In addition, each database may store voice (pronunciation) information or format, syllable, morpheme, a word, a keyword, or sentence information. Accordingly, the controller 180 can determine a voice recognizing operation and a meaning of a voice instruction by using at least one of the plurality of databases 161 to 164, and execute a menu related to a function or a service corresponding to the determined meaning of the voice instruction.

Figure 9:
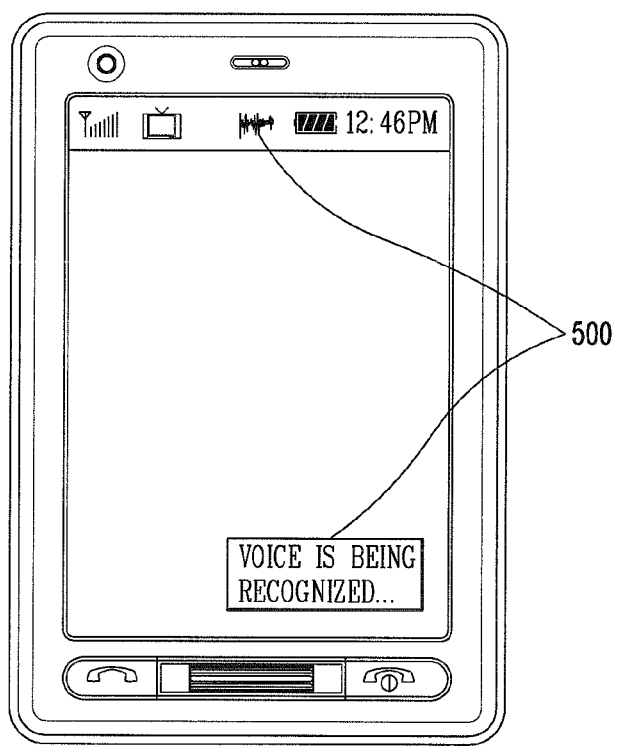
FIG. 9 is an overview of a display screen illustrating displaying a message informing a user that voice instruction is being executed in the mobile terminal according to an embodiment of the present invention.

Next, FIG. 9 is an overview of a display screen displaying information to inform the user that a recognized voice instruction is being executed in the mobile terminal according to an embodiment of the present invention. In more detail, when a voice instruction is recognized or a meaning of the voice instruction is determined by the controller 180, the controller 180 outputs a corresponding result value. The result value may be a control signal for executing a particular function of the mobile terminal, menu information related to the recognized instruction, or data information output when the function is executed. In FIG. 9, the controller 180 outputs information 500 information the user that the input voice instruction has been recognized.

Further, the above-described embodiments refer to recognizing the user's voice instruction. However, the present invention is also applicable to the user performing an additional input function while the voice instruction is being recognized. For example, a voice recognition and a touch input, a voice recognition and a button input, or a voice recognition or touch/button inputs may be simultaneously performed.

In addition, the controller 180 may prevent the voice recognition function from being performed in a particular mode or menu or in a particular operational state. Further, audio information (e.g., voice announcement or guidance information) or video information (e.g., the indicator 500 in FIG. 9) indicating that a voice recognition function is being applied may be displayed in the voice recognition mode, menu or operational state. Also, information that the voice recognition function is being applied may be provided to the user by outputting help information.

In addition, the above various embodiments may be implemented in a computer-readable medium using, for example, computer software, hardware, or some combination thereof. For a hardware implementation, the embodiments described above may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, the memory 160), and executed by a controller or processor (for example, the controller 180).

In addition, the mobile terminal 100 may be implemented in a variety of different configurations. Examples of such configurations include a folder-type, slide-type, bar-type, rotational-type, swing-type and combinations thereof.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal, comprising:
a display;
an input unit;
a memory including a database of information associated with functions or menus of the mobile terminal; and
a controller configured to:
initiate a voice recognition function in response to a touch input to a soft button displayed on the display or to a hard button on the mobile terminal, wherein the voice recognition function is maintained for a predetermined amount of time since the touch input to the soft button or to the hard button if there is no voice input detected by the mobile terminal during the predetermined amount of time, and wherein an audio information indicating an activation of the voice recognition function is provided;
convert a voice instruction input into text in response to detection of the voice instruction input;
display information to inform execution of a menu or function associated with the voice instruction input if a recognition rate of the voice instruction input to be related to the menu or function is higher than a threshold value, wherein the recognition rate of the voice instruction input with respect to the menu or function is improved via learning from the detection of the voice instruction input and the execution of the menu or function; and
execute the menu or function if the menu or function is only one among the functions or menus with the recognition rate of the voice instruction input to be related to the menu or function higher than the threshold value and display a plurality of menus or functions if a recognition rate of the voice instruction input to be related to each of the plurality of menus or functions is greater than the threshold value,
wherein one of the plurality of menus or functions is executed in response to selection of said one of the plurality of menus or functions.

2. The mobile terminal of claim 1, wherein the voice instruction input is in natural language.

3. The mobile terminal of claim 1, wherein the information comprises menu information related to the menu or function.

4. The mobile terminal of claim 1, wherein the information comprises data information output associated with the execution of the menu or function.

5. The mobile terminal of claim 1, wherein the activation of the voice recognition function is alternatively performed in response to a receipt of a radio signal from a wireless device.

6. The mobile terminal of claim 5, wherein the wireless device comprises a Bluetooth device.

7. The mobile terminal of claim 1, wherein the activation of the voice recognition function is alternatively performed in response to a receipt of a hand signal or a gesture of a user.

8. The mobile terminal of claim 1, wherein the memory is further configured to store the voice instruction input and the text.

9. The mobile terminal of claim 1, wherein the learning is further based on performance of at least one previous operation of the mobile terminal associated with the menu or function.

10. The mobile terminal of claim 1, wherein the database is continuously updated based on the learning.

11. The mobile terminal of claim 1, wherein the database comprises:
a first database configured to store voice or pronunciation information that is used by the controller to recognize the voice instruction input;
a second database configured to store a word, a keyword or sentence information that is used by the controller to recognize the voice instruction input;
a third database configured to store data related to the functions or menus; and
a fourth database configured to store help information to be output to inform that the controller is attempting to determine a meaning of the voice instruction input.

12. A method of controlling a mobile terminal, the method comprising:
initiating a voice recognition function in response to a touch input to a soft button displayed on a display of the mobile terminal or to a hard button on the mobile terminal, wherein the voice recognition function is maintained for a predetermined amount of time since the touch input to the soft button or to the hard button if there is no voice input detected by the mobile terminal during the predetermined amount of time, and wherein an audio information indicating an activation of the voice recognition function is provided;
converting a voice instruction input into text in response to detection of the voice instruction input;
displaying information on the display to inform execution of a menu or function of the mobile terminal associated with the voice instruction input if a recognition rate of the voice instruction input to be related to the menu or function is higher than a threshold value, wherein the recognition rate of the voice instruction input with respect to the menu or function is improved via learning from the detection of the voice instruction input and the execution of the menu or function; and
executing the menu or function if the menu or function is only one among the functions or menus with the recognition rate of the voice instruction input to be related to the menu or function higher than the threshold value and displaying a plurality of menus or functions on the display if a recognition rate of the voice instruction input to be related to each of the plurality of menus or functions is greater than the threshold value,
wherein one of the plurality of menus or functions is executed in response to selection of said one of the plurality of menus or functions.

13. The method of claim 12, wherein said one of the plurality of menus or functions is discriminately displayed from a remainder of the plurality of menus or functions.

14. The method of claim 13, wherein said one of the plurality of menus or functions is displayed by differentially controlling at least one of a size, a display position, a color, a contrast, or highlight information of said one of the plurality of menus or functions.

15. The method of claim 12, wherein the voice instruction input is in natural language.

16. The method of claim 12, wherein the information comprises menu information related to the menu or function.

17. The method of claim 12, wherein the information comprises data information output associated with the execution of the menu or function.

18. The method of claim 12, wherein the activation of the voice recognition function is alternatively performed in response to a receipt of a radio signal from a wireless device.

* * * * *